(12) United States Patent
Deshayes

(10) Patent No.: US 10,103,521 B2
(45) Date of Patent: Oct. 16, 2018

(54) ELECTRICAL POWER DISTRIBUTION PLATE COMPRISING A PROTECTED DISTRIBUTION BAR

(71) Applicant: ECE, Paris (FR)

(72) Inventor: Olivier Deshayes, Rosny Sous Bois (FR)

(73) Assignee: Zodiac Aero Electric, Montreuil (FR)

( * ) Notice: Subject to any disclaimer, the term of this patent is extended or adjusted under 35 U.S.C. 154(b) by 16 days.

(21) Appl. No.: 15/154,463

(22) Filed: May 13, 2016

(65) Prior Publication Data

US 2016/0329690 A1  Nov. 10, 2016

Related U.S. Application Data

(63) Continuation of application No. 13/675,740, filed on Nov. 13, 2012.

(30) Foreign Application Priority Data

Nov. 15, 2011  (FR) ..................... 11 60386

(51) Int. Cl.
*H02B 1/20* (2006.01)
*H02B 1/34* (2006.01)
*H02B 1/48* (2006.01)
*H02B 1/56* (2006.01)

(52) U.S. Cl.
CPC ............... *H02B 1/20* (2013.01); *H02B 1/207* (2013.01); *H02B 1/34* (2013.01); *H02B 1/48* (2013.01); *H02B 1/56* (2013.01)

(58) Field of Classification Search
None
See application file for complete search history.

(56) References Cited

U.S. PATENT DOCUMENTS

| 4,842,533 | A  | 6/1989 | Beberman et al. |
| 6,488,551 | B1 | 12/2002 | Tomlin et al. |
| 6,785,139 | B2 | 8/2004 | Onizuka et al. |
| 7,099,155 | B2 | 8/2006 | Kobayashi et al. |
| 7,154,753 | B2 | 12/2006 | Kobayashi |
| 7,283,366 | B2 | 10/2007 | Yamashita |
| 7,714,230 | B2 | 5/2010 | Beulque |
| 8,031,486 | B2 | 10/2011 | Wavering et al. |
| 8,094,436 | B2 | 1/2012 | Mills et al. |
| 8,462,509 | B2 | 6/2013 | Hsieh et al. |
| 8,559,149 | B2 | 10/2013 | Wavering et al. |

(Continued)

FOREIGN PATENT DOCUMENTS

| WO | 9419849 | 9/1994 |
| WO | 2008101067 | 8/2008 |

OTHER PUBLICATIONS

French Search Report for French Patent Application No. FR1160386 dated Jul. 5, 2012.

*Primary Examiner* — Dimary Lopez Cruz

(74) *Attorney, Agent, or Firm* — Meyertons, Hood, Kivlin, Kowert & Goetzel, P.C.; Mark R. DeLuca

(57) ABSTRACT

Electrical power distribution plate comprising a distribution bar, a first mounting board to which the distribution bar is attached and a contactor connected to the distribution bar. The plate comprises a second mounting board attached to the distribution bar so that the distribution bar is placed between the first mounting board and the second mounting board.

16 Claims, 1 Drawing Sheet

(56) References Cited

U.S. PATENT DOCUMENTS

| | | |
|---|---|---|
| 8,737,075 B2 | 5/2014 | Yamashita et al. |
| 2001/0043014 A1 | 11/2001 | Pradier et al. |
| 2008/0266803 A1* | 10/2008 | Golhardt .............. H02K 9/20 361/700 |
| 2012/0236504 A1 | 9/2012 | Wortberg et al. |

* cited by examiner

ELECTRICAL POWER DISTRIBUTION PLATE COMPRISING A PROTECTED DISTRIBUTION BAR

PRIORITY CLAIM

The present application is a continuation of U.S. patent application Ser. No. 13/675,740, filed Nov. 13, 2012, which claims priority to French Patent Application Serial No. FR 1160386, filed Nov. 15, 2011.

BACKGROUND OF THE INVENTION

1. Field of the Invention

The invention relates to electrical power distribution boxes, and more particularly to the protection of the distribution bars of primary boxes.

2. Description of the Relevant Art

An aircraft usually has an electrical system comprising notably a primary electrical power distribution circuit. This primary distribution circuit is used to protect and to distribute the electrical power originating from internal sources, for example generators or batteries or from external sources, such as power units or a ground power unit, to payloads or to other distribution boxes of the aircraft.

A primary distribution box usually comprises a power portion and an electronic portion. The power portion relays, with the aid of cables, the power produced from electrical generators driven by engines. Each primary, secondary or other electrical power distribution box comprises distribution components, the function of some of which is to switch the electrical power received to a distribution bar included in the same electrical power distribution box or in another electrical power distribution box.

A distribution bar, or power bar, is a conductive bar to which are coupled, on the one hand, an electrical power source, and, on the other hand, various electrical members to which the electrical power received by the distribution bar is distributed. The electrical power source may be a generator in the case of a distribution bar of a primary electrical distribution box, or a primary electrical distribution box in the case of a distribution bar of a secondary electrical distribution box. These electrical members to which the electrical power received by the distribution bar is distributed may be secondary distribution sub-networks or electrical loads.

The distribution bars are naturally conductive and are continually coupled to electrical power sources. However, it happens that conductive objects, notably screws or nuts become separated from the box because of the level of vibration that prevails in aircraft. Such objects are then likely to fall into the bottom of the box and come into contact with the distribution bars. Although relatively exceptional, this type of accident is likely to disrupt the electrical flow, or even cause an accidental short-circuit, between one distribution bar and another bar or ground.

The distribution bars must therefore be protected from the surrounding conductive objects. The electrical power distribution plates usually comprise, for this purpose, at least one distribution bar mounted on the surface of an epoxy mounting board. But such an assembly only partially protects the distribution bar since only one surface is covered by the epoxy mounting board. This protection is only partial especially since fastening elements, such as fastening screws protrude on each side of the distribution bar. Therefore, fastening screws also protrude on the side of the epoxy mounting board, passing through the latter and providing a conductive element coupled to the distribution bar accessible to a surrounding object on the side of the epoxy mounting board.

Usually, as illustrated in FIG. 1, the distribution bars 1 are attached with the aid of rivets 2 to the epoxy mounting board 3, the rivets 2 protruding on the side of the distribution bars 1 and of the epoxy mounting board 3. A contactor 4 is also attached to the distribution bars 1 with the aid of captive screws 5 on the contactor 4 and floating nuts 6 on the distribution bars 1. The contactor 4 is controlled by a cabling strand 7. Finally, the voltages of the distribution bars 1 are absorbed by means of a cable crimped into a terminal 8 and attached with the aid of a crimped post, a washer and a nut 9 to the distribution bars 1.

Such assemblies do not therefore make it possible to protect the distribution bars in the event of contact of a foreign body with the distribution bar. Specifically, foreign bodies can fall onto a conductive portion coupled to the distribution bars and cause a short-circuit which may develop an electrical arc leading to the destruction of the distribution bars.

SUMMARY OF THE INVENTION

The object of the invention is to solve the problems mentioned above by proposing an electrical power distribution plate incorporated into an assembly of insulating mounting boards.

According to one embodiment, what is proposed in one embodiment is an electrical power distribution plate which comprises a distribution bar, a first mounting board to which the distribution bar is attached and a contactor connected to the distribution bar.

According to a general feature, the distribution plate comprises a second mounting board attached to the distribution bar so that the distribution bar is placed between the first mounting board and the second mounting board.

Incorporating the distribution bar between two insulating mounting boards, for example made of epoxy, makes it possible to protect the distribution bar against direct contacts from any unattached objects on the distribution bar. The distribution bar can be bonded to the first and second mounting boards.

Preferably, the contactor is an irremovable contactor mounted on the distribution bar via at least one cut-out made in the second mounting board.

The irremovable contactor ("the non line unit replaceable contactor") is used to dispense with the captive fastening screws used to fasten a removable contactor. This type of contactor can be mounted directly on the distribution bar through cut-outs made in the second mounting board. Moreover, such an irremovable contactor makes it possible to dispense with the fastening rivets used between the distribution bar and a mounting board for the rigidity of the distribution plate, by using the fastening of the irremovable contactor.

Dispensing with the captive screws and rivets makes it possible to eliminate two conductive elements in direct contact with the distribution plate that can come into contact with adjacent objects. This reduces the risks of short-circuits. The distribution bar is also completely protected against the foreign bodies.

The distribution plate may advantageously comprise a cooling device attached to a face of the first mounting board opposite to the face facing the distribution bar.

The contactor is a power switching component and consequently gives off a considerable quantity of heat energy.

The cooling device attached to the first mounting board allows a better dissipation of the heat given off by the contactor.

Preferably, the cooling device is bonded to the first mounting board. The heat-conductive adhesive used to attach the cooling device to the first mounting board also makes it possible to improve contact resistance and consequently to improve the heat exchanges.

The cooling device may also be riveted to the first mounting board and/or the second mounting board outside the zones comprising the distribution bar, the rivet passing through only the mounting board(s), with no contact with the distribution bar. The use of rivets makes it possible to improve the rigidity of the distribution plate.

The cooling device may advantageously comprise an aluminum plate or else a sealed compartment making it possible to cause a cooling gas or a coolant to circulate.

The cooling of the distribution plate may thus be improved by the use of forced convection, or the use of a coolant, the circulation of the latter in the sealed compartment improving the heat exchanges relative to a virtually static fluid in the compartment.

Preferably, the second mounting board comprises an electronic routing defining an electronic circuit on a surface of the second mounting board opposite to the surface of the said second mounting board facing the distribution bar.

The use of a circuit board routed on the second mounting board instead of voltage transplants on the distribution plate makes it possible to eliminate the risks of short-circuit and of electrical arc at the transplants.

Preferably, the second mounting board is attached to the distribution bar by a conductive adhesive. The electrical link between the electrical routing of the second mounting board and the distribution bar is achieved by the conductive adhesive at vias created between the face of the second mounting board facing the distribution bar and the face opposite to the second mounting board.

The distribution plate may advantageously comprise electrical components coupled to the electronic routing on the second mounting board.

The distribution plate may thus incorporate electrical or electronic components for the functions of power supply, and/or of protection, and/or of control, and/or of communication, and/or of logic.

Advantageously, the distribution plate may comprise an interfacing connection making it possible to couple the electrical routing of the said distribution plate to an electrical rack.

The interfacing connection is used to interface the electrical routing signals of the second mounting board.

The distribution plate may comprise a free portion of distribution bar making it possible to achieve, at one end of the distribution bar, a coupling between the distribution bar and a power interface of the electrical rack.

On the free portion, the distribution bar is not included between the first mounting board and the second mounting board. The power interface, like a connector, a fork, a contact, or else a power strip for example, is used to electrically couple the distribution bar to a distribution circuit which can be coupled to other distribution bars. It is therefore possible to couple together a plurality of electrical power distribution plates. The power interface is electrically insulated from the interfacing connection. In this configuration, the distribution plate is able to be plugged into a rack.

The second mounting board may also comprise heat-dissipating planes included between the surface facing the distribution bar and the surface on which the electronic routing is produced.

The heat-dissipating planes may be made of copper or another conductive material. They allow a better heat diffusion over the whole of the distribution plate.

The distribution bar has a thickness of 2 mm give or take 0.5 mm and more particularly give or take 0.2 mm, and the first mounting board has a thickness of 1.6 mm give or take 0.5 mm and preferably 0.2 mm, and the second mounting board has a thickness of 0.5 mm give or take 0.2 mm.

Such dimensions make it possible to obtain an electrical power distribution plate of which the thickness is similar to the distribution plates already known that do not have the advantages of the invention. The first mounting board and the second mounting board are obtained by cutting into two a mounting board used in the prior art. Thus, the overall thickness is not increased.

According to another aspect, what is proposed in one embodiment is an electrical distribution box comprising an electrical power distribution plate as defined above.

BRIEF DESCRIPTION OF THE DRAWINGS

Other advantages and features of the invention will appear on examination of the description of a detailed embodiment of the invention that is in no way limiting, and of the appended drawings, in which.

Figure 1:
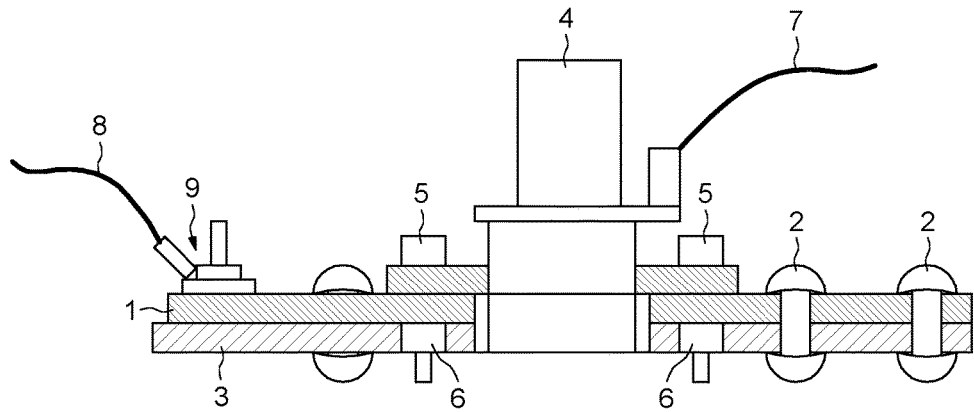
FIG. 1, already described, illustrates schematically a view in section of an electrical power distribution plate according to the prior art.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

Figure 2:
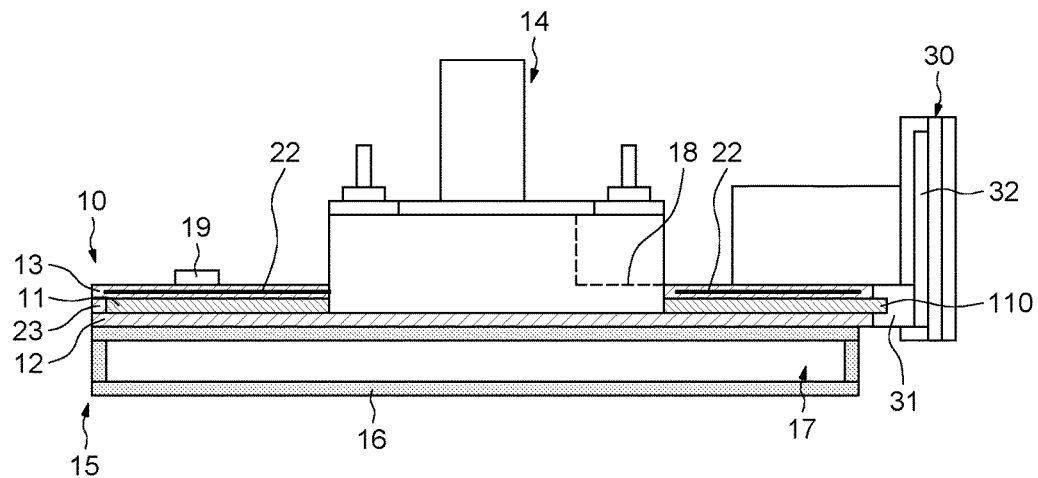
FIGS. 2 and 3 illustrate respectively schematically a view in section and a view from above of an electrical power distribution plate according to one embodiment.
Figure 3:
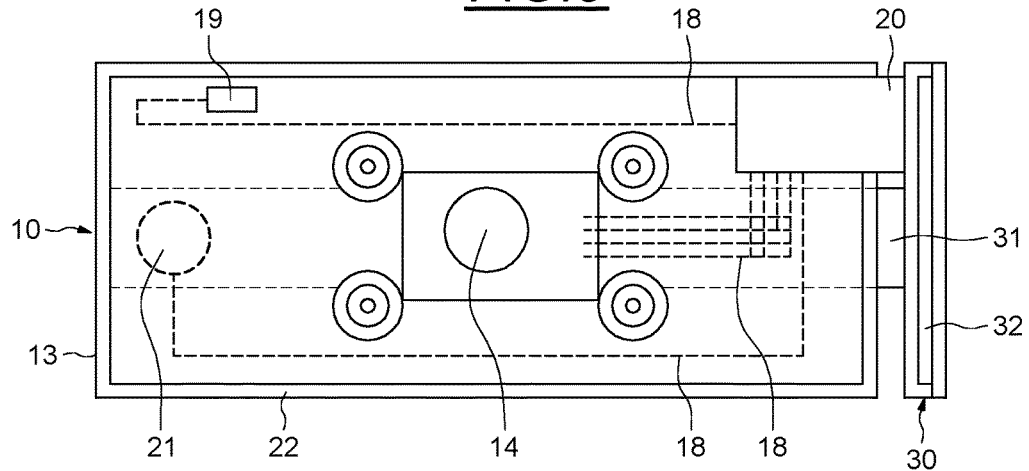

FIGS. 2 and 3 show respectively a view in section and a view from above of an electrical power distribution plate 10 according to one embodiment of the invention.

The electrical power distribution plate 10 comprises a distribution bar 11 included between a first mounting board 12 and a second mounting board 13, a contactor 14 and a cooling device 15.

The distribution bar 11 is bonded to the first mounting board 12 and to the second mounting board 13 with the aid of a conductive adhesive in order to improve the heat exchanges and electrical conduction as will be described below. The first and the second mounting boards 12 and 13 are made in this example of epoxy in order to ensure a good electrical insulation between the distribution bar 2 and the foreign bodies which might fall on the first and second mounting boards 12 and 13.

In this illustrated example, the distribution bar 11 has a thickness of 4 mm give or take 0.2 mm, the first mounting board has a thickness of 1.6 mm give or take 0.2 mm, and the second mounting board has a thickness of 0.5 mm give or take 0.2 mm.

The contactor 14 is an irremovable contactor 14 or a "non line replaceable unit". The contactor 14 is attached in this example to the first mounting board 12 through a first cut-out made in the second mounting board 13 and through a second cut-out made in the electrical distribution bar 11 coaxial with the first cut-out. The contactor 14 is electrically connected directly to the distribution bar 11. The attachment of the contactor makes it possible to improve the rigidity of the assembly consisting of the distribution bar 11 and the first mounting board 12 and the second mounting board 13.

The cooling device 15 is bonded to a face of the first mounting board 12 opposite to the face facing the distribution bar 11, with the aid of a thermally conductive adhesive. The conductive adhesive promotes the heat exchanges between the cooling device 15 and the second mounting board 13 which is directly in contact with the distribution bar 11 and the contactor 15 that are two power components giving off considerable heat when they are operating.

In this example, the cooling device 15 comprises a sealed compartment 16 in which a coolant 17 circulates (for example: 60% glycol and 40% water).

As illustrated in FIG. 3, the second mounting board 13 comprises an electronic circuit 18 routed on the surface of the second mounting board 13 opposite to the surface of the second mounting board 13 facing the distribution bar 11. The routing of the electronic circuit 18 on the second mounting board 13 makes it possible to define the second mounting board 13 as a circuit board. The second mounting board 13 comprises electronic components 19 electrically coupled to the electronic circuit 18, an interfacing connection 20 electrically connected to the electronic circuit 18, and vias 21 making it possible to electrically couple the distribution bar 11 to the electronic circuit 18.

The interfacing connection 20 makes it possible to control the electrical signals transmitted to the electronic components 19 via the electronic circuit 18.

The interfacing connection 20 is coupled to a connector corresponding to an electrical rack 30. The electrical rack 30 also comprises a power interface 31 that is electrically connected to the distribution bar 11 when the electrical power distribution plate 10 is plugged into the electrical rack 30. The electrical coupling between the distribution bar 11 and the power interface 31 is achieved by plugging a free portion 110 of the distribution bar 11, that is to say a portion not covered by the second mounting board 13 and/or the first mounting board 12, into the power interface 31.

The electrical rack 30 also comprises a conductive bar 32 connected to the power interface 31 and making it possible to carry the electrical power from the distribution bar 11 to other distribution bars of plates plugged into the rack for example.

Moreover, as illustrated in FIGS. 2 and 3, the second mounting board 13 comprises heat-dissipation planes 22 made of copper and included between the surface facing the distribution bar 11 and the surface on which the electronic routing 18 is produced.

Moreover, the distribution plate 10 also comprises an insulating board connection 23 bonded between the first mounting board 12 and the second mounting board 13 at the end of the distribution bar 11 opposite to the end comprising the free portion 110. The insulating board connection can be included over the whole perimeter with the exception of the free portion 110 so as to insulate the distribution bar 11.

The proposed invention makes it possible to incorporate the distribution bar of an electrical power distribution plate between two insulating mounting boards so as to protect the distribution bar from foreign bodies that may come into contact with the distribution bar and create short circuits or electrical arcs.

The invention makes it possible to gain weight in the incorporation of the power bar and reduce the cost of fabrication, given the reduced number of steps and of fastening elements relative to the prior art.

The invention also makes it possible to obtain a better heat dissipation of the contactor, and of the assembly consisting of the distribution bar and of the first and second mounting boards. Moreover, the distribution plate thus proposed can be plugged into an electrical rack so as to allow several plates to be rack installed and to make replacement easier.

Moreover, since the distribution bar is completely protected, the distribution box comprising the distribution bar can be open and comprise no cover, thus reducing the volume that the distribution box occupies. Finally, the electrical routing that is produced makes it possible to dispense with the electronic cabling between the electronic components of the distribution plate and the control electronics.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An electrical power distribution plate comprising a distribution bar, a first mounting board to which the distribution bar is attached, a contactor connected to the distribution bar, and a second mounting board attached to the distribution bar so that the distribution bar is placed between the first mounting board and the second mounting board, the distribution bar being bonded to the first mounting board and to the second mounting board by a conductive adhesive.

2. The plate of claim 1, wherein the contactor is an irremovable contactor mounted on the distribution bar via at least one cut-out made in the second mounting board.

3. The plate of claim 1, further comprising a cooling device attached to a face of the first mounting board opposite to the face facing the distribution bar.

4. The plate of claim 3, wherein the cooling device is bonded to the first mounting board.

5. The plate of claim 3, wherein the cooling device comprises an aluminum plate.

6. The plate of claim 3, wherein the cooling device comprises a sealed compartment making it possible to cause a cooling gas or a coolant to circulate.

7. The plate of claim 1, wherein the second mounting board comprises an electronic routing defining an electronic circuit on a surface of the second mounting board opposite to the surface of the said second mounting board facing the distribution bar.

8. The plate of claim 7, wherein the second mounting board is attached to the distribution bar by a conductive adhesive.

9. The plate of claim 7, further comprising electrical components coupled to the electronic routing on the second mounting board.

10. The plate of claim 7, further comprising an interfacing connection making it possible to couple the said plate to an electrical rack.

11. The plate of claim 10, further comprising a free portion of the distribution bar making it possible to achieve, at one end of the distribution bar a coupling between the distribution bar and a power interface of the electrical rack.

12. The plate of claim 7, wherein the second mounting board comprises heat-dissipating planes included between the surface facing the distribution bar and the surface on which the electronic routing is produced.

13. The plate of claim 1, wherein the distribution bar has a thickness of about 2 mm, and the first mounting board has a thickness of about 1.6 mm, and the second mounting board has a thickness of about 0.5 mm.

14. The plate of claim 1, further including vias extending between a face of the second mounting board facing the distribution bar and a face opposite to the second mounting board.

15. The plate of claim 3, wherein the cooling device comprises a sealed compartment, cooling of the distribution plate being improved by the use of forced convection.

16. An electrical distribution box comprising an electrical power distribution plate as described in any preceding claim.

* * * * *